(12) United States Patent
Chen et al.

(10) Patent No.: US 10,776,224 B2
(45) Date of Patent: Sep. 15, 2020

(54) RECOVERY AFTER SERVICE DISRUPTION DURING AN ACTIVE/ACTIVE REPLICATION SESSION

(71) Applicant: EMC IP Holding Company LLC, Hopkinton, MA (US)

(72) Inventors: Xiangping Chen, Sherborn, MA (US); Ying Hu, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 127 days.

(21) Appl. No.: 16/264,982

(22) Filed: Feb. 1, 2019

(65) Prior Publication Data

US 2020/0250052 A1    Aug. 6, 2020

(51) Int. Cl.
*G06F 11/00* (2006.01)
*G06F 11/14* (2006.01)
*G06F 3/06* (2006.01)

(52) U.S. Cl.
CPC .......... *G06F 11/1471* (2013.01); *G06F 3/065* (2013.01); *G06F 3/067* (2013.01); *G06F 3/0619* (2013.01); *G06F 2201/84* (2013.01)

(58) Field of Classification Search
CPC .................................................. G06F 11/1471
See application file for complete search history.

(56) References Cited

U.S. PATENT DOCUMENTS

| | | |
|---|---|---|
| 7,475,124 B2 | 1/2009 | Jiang et al. |
| 8,327,103 B1 | 12/2012 | Can et al. |
| 8,380,928 B1 | 2/2013 | Chen et al. |
| 8,429,346 B1 | 4/2013 | Chen et al. |
| 8,515,911 B1 | 8/2013 | Zhou et al. |
| 8,539,148 B1 | 9/2013 | Chen et al. |
| 8,566,483 B1 | 10/2013 | Chen et al. |
| 8,583,607 B1 | 11/2013 | Chen et al. |
| 8,683,153 B1 | 3/2014 | Long et al. |
| 8,712,976 B1 | 4/2014 | Chen et al. |
| 8,775,388 B1 | 7/2014 | Chen et al. |

(Continued)

OTHER PUBLICATIONS

U.S. Appl. No. 16/048,767, filed Jul. 30, 2018, Chen et al.

(Continued)

*Primary Examiner* — Katherine Lin
(74) *Attorney, Agent, or Firm* — Daly Crowley Mofford & Durkee, LLP (57) ABSTRACT

In one aspect, providing recovery during active/active replication includes: creating, at a first storage device, a local snapset; waiting for inflight (input/output) IO operations (IOs) from the first device to a second device at the time snapset creation to complete; creating a recovery snapset; and waiting for inflight IOs from the second device to the first device, at the time of snapset creation to complete. Upon determining a failure event, an aspect includes identifying a most recent local snapset (Sk) and a most recent recovery snapset (Sk') on the first and second devices, respectively, identifying predecessor snapsets (Sk−1) and (Sk−1') on the first and second devices, respectively, creating a new recovery snapset (Sk') using (Sk−1'), sending the delta of (Sk) and (Sk−1) from the first device to the second device; updating (Sk') with the delta; and performing async-to-sync recovery to transfer a difference between the first and second devices.

20 Claims, 6 Drawing Sheets

(56) References Cited

U.S. PATENT DOCUMENTS

| | | |
|---|---|---|
| 8,782,324 B1 | 7/2014 | Chen et al. |
| 8,799,601 B1 | 8/2014 | Chen et al. |
| 8,909,887 B1 | 12/2014 | Armangau et al. |
| 8,930,746 B1 | 1/2015 | Chen et al. |
| 8,954,699 B1 | 2/2015 | Chen et al. |
| 8,977,812 B1 | 3/2015 | Chen et al. |
| 9,037,818 B1 * | 5/2015 | Natanzon ............... G06F 3/067 |
| | | 711/162 |
| 9,152,336 B1 | 10/2015 | Chen et al. |
| 9,304,889 B1 | 4/2016 | Chen et al. |
| 9,355,112 B1 | 5/2016 | Armangau et al. |
| 9,384,206 B1 | 7/2016 | Bono et al. |
| 9,395,937 B1 | 7/2016 | Si et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,513,814 B1 | 12/2016 | Can et al. |
| 9,529,545 B1 | 12/2016 | Bono et al. |
| 9,542,125 B1 | 1/2017 | Chen |
| 9,594,514 B1 | 3/2017 | Bono et al. |
| 9,684,593 B1 | 6/2017 | Chen et al. |
| 9,710,187 B1 | 7/2017 | Si et al. |
| 9,811,288 B1 | 11/2017 | Chen et al. |
| 9,817,766 B1 | 11/2017 | Si et al. |
| 10,037,369 B1 | 7/2018 | Bono et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,176,046 B1 | 1/2019 | Hu et al. |
| 10,191,755 B1 * | 1/2019 | Natanzon ............... G06F 3/065 |
| 10,235,066 B1 | 3/2019 | Chen et al. |
| 2006/0200533 A1 * | 9/2006 | Holenstein ............ G06F 16/273 |
| | | 709/208 |
| 2015/0378767 A1 * | 12/2015 | Tarasuk-Levin ...... G06F 9/5088 |
| | | 718/1 |
| 2015/0378847 A1 * | 12/2015 | Tarasuk-Levin .... G06F 11/2097 |
| | | 714/19 |

OTHER PUBLICATIONS

U.S. Appl. No. 16/169,202, filed Oct. 24, 2018, Chen et al.
U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/263,414, filed Jan. 31, 2019, Meiri et al.
U.S. Appl. No. 15/076,775, filed Mar. 22, 2016, Chen et al.
U.S. Appl. No. 15/085,188, filed Mar. 30, 2016, Meiri et al.
U.S. Appl. No. 15/499,943, filed Apr. 28, 2017, Kucherov et al.
U.S. Appl. No. 15/499,935, filed Apr. 28, 2017, Chen et al.
U.S. Appl. No. 15/499,949, filed Apr. 28, 2017, Chen et al.
U.S. Appl. No. 15/499,947, filed Apr. 28, 2017, Kucherov et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 15/885,027, filed Jan. 31, 2018, Chen et al.
U.S. Appl. No. 16/042,363, filed Jul. 23, 2018, Chen et al.
U.S. Appl. No. 16/038,543, filed Jul. 18, 2018, Chen et al.

* cited by examiner

RECOVERY AFTER SERVICE DISRUPTION DURING AN ACTIVE/ACTIVE REPLICATION SESSION

BACKGROUND

Data replication techniques enable organizations to protect data from loss, implement disaster recovery, or to migrate data between locations. There are various types of replication modes that can be utilized by an organization, and each mode comes with its own advantages and disadvantages.

One popular mode of data replication is active/active replication in which a network of servers and applications concurrently perform input/output (IO) operations across a virtualized storage layer. In active/active replication, storage nodes in two independent arrays can present to servers as a single storage object with two paths, and multiple nodes in a server cluster can write to both arrays concurrently where updates from either side are synchronously replicated to peers. This type of replication provides advantages such as continuous availability, as replication operations are not interrupted when one system or node in the network goes down.

However, due to various issues such as communication failures or software/hardware issues, the two sides in the replication session may lose connection with each other, and the data between them may become out of sync. Other issues include a locking conflict that leads to a cluster service stop. It is important to be able to recover from these failure events and bring the two sides back in sync with minimum cost during regular runtime as well as during recovery.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for providing recovery after a service disruption during an active/active replication session. The method includes during the active/active replication session, creating a sequence of snapsets at a first storage device and a second storage device. Creating the sequence of snapsets includes: periodically creating, at the first storage device, a local snapset; waiting, by the first storage device, for inflight (input/output) IO operations (IOs) from the first storage device to the second storage device, at the time of creation of the local snapset, to complete at the second storage device; creating, at the second storage device, a recovery snapset; and waiting, by the second storage device, for inflight IOs from the second storage device to the first storage device, at the time of creation of the recovery snapset, to complete at the first storage device. Upon determining an occurrence of a failure event in which the first storage device and the second storage device are out of sync, the method includes identifying a most recent local snapset (Sk) on the first storage device and a most recent recovery snapset (Sk') on the second storage device, identifying a predecessor local snapset (Sk−1) on the first storage device and a predecessor recovery snapset (Sk−1') on the second storage device, creating a new recovery snapset (Sk') using the predecessor recovery snapset (Sk−1') at the second storage device, sending a delta of the most recent local snapset (Sk) and the predecessor local snapset (Sk−1) from the first storage device to the second storage device, and updating the new recovery snapset (Sk') at the second storage device with the delta. The method also includes performing asynchronous to synchronous recovery to transfer a difference from the first storage device to the second storage device. The asynchronous to synchronous recovery provides synchronicity of snapsets between the first storage device and the second storage device.

Another aspect may provide a system for providing recovery after a service disruption during an active/active replication session. The system includes a memory having computer-executable instructions. The system also includes a processor operated by a storage system. The processor executes the computer-executable instructions. When executed by the processor, the computer-executable instructions cause the processor to perform operations. The operations include during the active/active replication session, creating a sequence of snapsets at a first storage device and a second storage device. Creating the sequence of snapsets includes: periodically creating, at the first storage device, a local snapset; waiting, by the first storage device, for inflight (input/output) IO operations (IOs) from the first storage device to the second storage device, at the time of creation of the local snapset, to complete at the second storage device; creating, at the second storage device, a recovery snapset; and waiting, by the second storage device, for inflight IOs from the second storage device to the first storage device, at the time of creation of the recovery snapset, to complete at the first storage device. Upon determining an occurrence of a failure event in which the first storage device and the second storage device are out of sync, the operations include identifying a most recent local snapset (Sk) on the first storage device and a most recent recovery snapset (Sk') on the second storage device, identifying a predecessor local snapset (Sk−1) on the first storage device and a predecessor recovery snapset (Sk−1') on the second storage device, creating a new recovery snapset (Sk') using the predecessor recovery snapset (Sk−1') at the second storage device, sending a delta of the most recent local snapset (Sk) and the predecessor local snapset (Sk−1) from the first storage device to the second storage device, and updating the new recovery snapset (Sk') at the second storage device with the delta. The operations further include performing asynchronous to synchronous recovery to transfer a difference from the first storage device to the second storage device. The asynchronous to synchronous recovery provides synchronicity of snapsets between the first storage device and the second storage device.

Another aspect may provide a computer program product for providing recovery after a service disruption during an active/active replication session. The computer program is embodied on a non-transitory computer readable medium. The computer program product includes instructions that, when executed by a computer at a storage system, causes the computer to perform operations. The operations include during the active/active replication session, creating a sequence of snapsets at a first storage device and a second storage device. Creating the sequence of snapsets includes: periodically creating, at the first storage device, a local snapset; waiting, by the first storage device, for inflight (input/output) IO operations (IOs) from the first storage device to the second storage device, at the time of creation of the local snapset, to complete at the second storage device; creating, at the second storage device, a recovery snapset; and waiting, by the second storage device, for inflight IOs from the second storage device to the first storage device, at the time of creation of the recovery snapset, to complete at the first storage device. Upon determining an occurrence of a failure event in which the first storage device and the second storage device are out of sync, the operations include identifying a most recent local snapset (Sk) on the first storage device and a most recent recovery snapset (Sk') on the second storage device, identifying a predecessor local snapset (Sk−1) on the first storage device and a predecessor recovery snapset (Sk−1') on the second storage device, creating a new recovery snapset (Sk') using the predecessor recovery snapset (Sk−1') at the second storage device, sending a delta of the most recent local snapset (Sk) and the predecessor local snapset (Sk−1) from the first storage device to the second storage device, and updating the new recovery snapset (Sk') at the second storage device with the delta. The operations further include performing asynchronous to synchronous recovery to transfer a difference from the first storage device to the second storage device. The asynchronous to synchronous recovery provides synchronicity of snapsets between the first storage device and the second storage device.

BRIEF DESCRIPTION OF THE DRAWINGS

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Embodiments described herein provide recovery after a service disruption during an active/active replication session. In active/active replication, a network of servers and applications concurrently perform input/output (IO) operations across a virtualized storage layer. Storage nodes in two independent arrays can present to servers as a single storage object with two paths, and multiple nodes in a server cluster can write to both arrays concurrently where updates from either side are synchronously replicated to peers.

However, due to various issues such as communication failures or software/hardware issues, the two sides in the replication session may lose connection with each other, and the data between them may become out of sync. Other issues include a locking conflict that leads to a cluster service stop. It is important to be able to recover from these failure events and bring the two sides back in sync with minimum cost during regular runtime as well as during recovery.

Embodiments described herein provide a mechanism for bringing two sides of an active/active replication session back into sync in response to a failure event without additional time-consuming functions associated with rolling back inflight IOs or synchronized snapsets, thus, minimizing impact on system performance.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable and may also be referred to herein as a computer-readable program medium.

In certain embodiments, the term "I/O request" or simply "I/O" or "IO" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, a snapshot may refer to differential representations of an image, i.e. the snapshot may have pointers to the original volume and may point to log volumes for changed locations. In certain embodiments, a snapshot may refer to differential representations of the state of a system. Snapshots may be combined into a snapshot array, which may represent different images over a time period or different states of a system over a time period. In certain embodiments, a snapset refers to a set of related snapshots that are created in a consistent manner. For example, all volumes used by one application (e.g., a database) can be grouped in a consistency group. The snapshots of the consistency group are referred to as a snapset.

In certain embodiments, a journal may be a record of write transactions (e.g., I/O data) issued to a storage system, which may be used to maintain a duplicate storage system, and to roll back the duplicate storage system to a previous point in time. In some embodiments, each entry in a journal contains, apart from the I/O data itself, I/O metadata that can include information such as a volume identifier (ID), the I/O block offset within the volume, the I/O length, and a timestamp of the I/O.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time. A checkpoint can preserve a snapshot of an application's state, so that it can restart from that point in case of failure, which can be useful for long running applications that are executed in failure-prone computing systems. If a checkpoint is used, an application periodically writes large volumes of snapshot data to persistent storage in an attempt to capture its current state. Thus, if there is a failure, the application can recover by rolling-back its execution state to a previously saved checkpoint.

In certain embodiments, active/active replication refers to a mode of data replication in which a network of servers and applications concurrently perform input/output (IO) operations across a virtualized storage layer. This type of replication provides advantages such as continuous availability, as replication operations are not interrupted when one system or node in the network goes down.

In certain embodiments, an extent refers to a contiguous area of storage reserved for a file system that is represented as a range of blocks. For example, a file may consist of zero or more extents and one file fragment would require one extent.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

Figure 1:
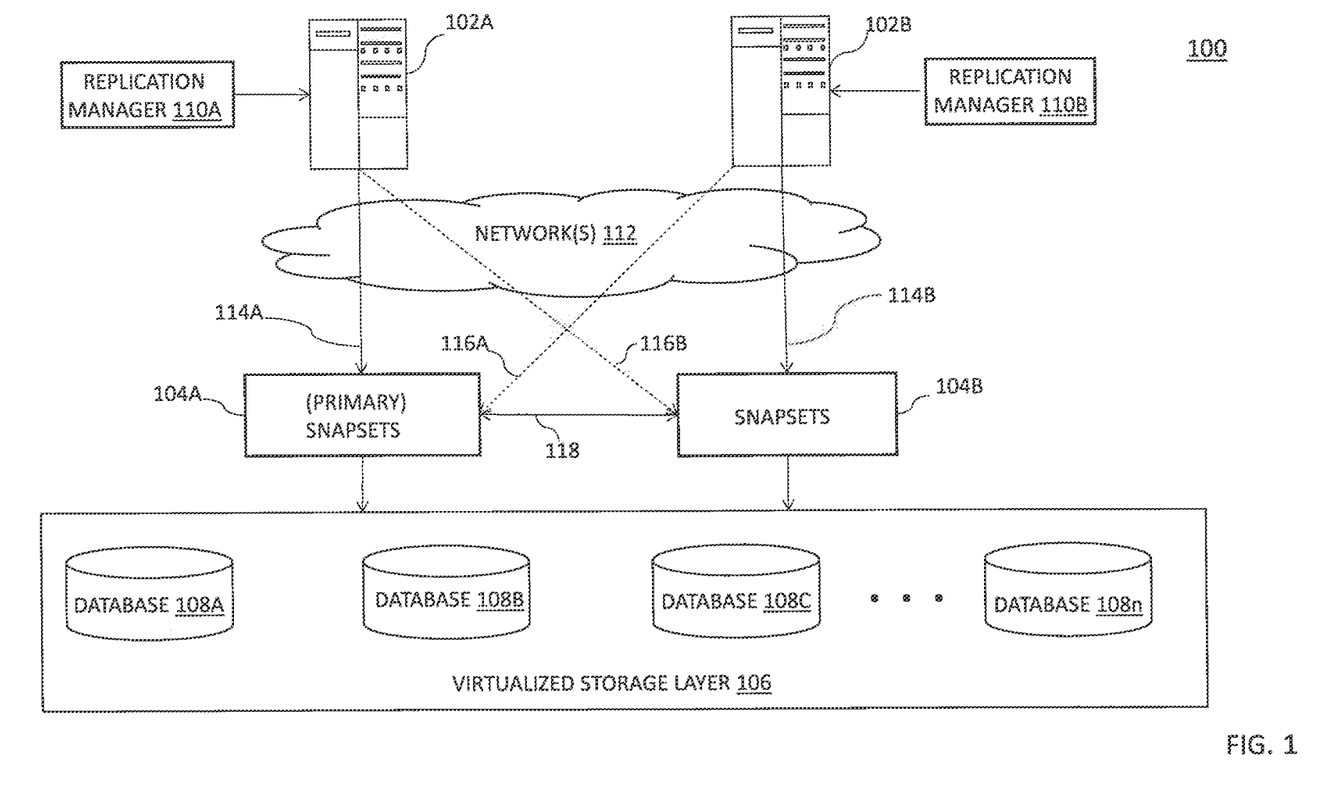
FIG. 1 is a block diagram of a storage system for providing recovery after a service disruption during an active/active replication session in accordance with an illustrative embodiment.

Turning now to FIG. 1, an example storage system 100 for performing recovery after a service disruption during an active/active replication session will now be described. The processes described herein provide a mechanism to bring both sides of an active/active replication session back into sync in response to a failure event without requiring additional time-consuming functions otherwise associated with rolling back inflight IOs or synchronized snapsets, thus, minimizing impact on system performance. As indicated above, active/active replication refers to a mode of data replication in which a network of servers and applications concurrently perform input/output (IO) operations across a virtualized storage layer. This type of replication mode can create challenges, e.g., where a failure event occurs and data between two systems become out of sync.

The system 100 includes a first host system computer 102A and a second host system computer 102B. Each of the host system computers 102A and 102B is communicatively coupled to storage devices 104A and 104B over one or more networks 112. The host system computers 102A and 102B may be implemented as high-speed computer processing devices, such as one or more mainframe computers capable of handling a high volume of activities conducted on behalf of end users of the active/active replication session.

The storage devices 104A and 104B store a variety of data used by the host system computers 102A and 102B in implementing the active/active replication session. It is understood that the storage devices 104A and 104B may be implemented using memory contained in their respective host system computers 102A and 102B or may be separate physical devices. The storage devices 104A and 104B may be logically addressable as consolidated data sources across a distributed environment that includes the networks 112. The storage devices 104A-104B may communicate over a replication link 118 to perform replication write operations. For example, in embodiments, storage device 104A receives a write IO request from host system computer 102A and, once the write operation has been completed on the storage device 104A, the write IO is replicated to the storage device 104B over the replication link 118. It is understood that other means of communication between the storage devices 104A-104B may be employed, e.g., through one or more networks of networks 112.

The host system computers 102A-102B may operate as database servers and coordinate access to application data including data stored in the storage devices 104A and 104B. The host system computers 102A-102B may be implemented using one or more servers operating in response to a computer program stored in a storage medium accessible by the servers. The host system computers 102A-102B may each operate as a network server (e.g., a web server) to communicate with any network entities, such as storage systems 104A and 104B.

Storage devices 104A and 104B may be implemented as varying types of storage devices. For example, the storage devices 104A and 104B may include one or more rotating magnetic storage devices, one or more rotating optical storage devices, and/or one or more solid state drives (SSDs), such as a flash drive. The storage devices 104A and 104B may include one or more hard disk drives (HDD), one or more flash drives, optical disks, as well as one or more other types of data storage devices. In other examples, the storage devices 104A and 104B may include a set of one or more data storage arrays. A data storage array may be, for example, a redundant array of inexpensive disks (RAID) array, an optical storage array, or any other type of data storage array.

The networks 112 may be any type of known networks including, but not limited to, a storage area network (SAN), wide area network (WAN), a local area network (LAN), a global network (e.g. Internet), a virtual private network (VPN), and an intranet. The networks 112 may be implemented using wireless networks or any kind of physical network implementation known in the art, e.g., using cellular, satellite, and/or terrestrial network technologies. The networks 112 may also include short range wireless networks utilizing, e.g., BLUETOOTH™ and WI-FI™ technologies and protocols.

In some embodiments, host system computer 102A and storage device 104A reside in a first data center (not shown), and host system computer 102B and storage device 104B reside in a second data center. That is, host system computers 102A and 102B may reside in geographically disparate locations. In this embodiment, the host system computer 102A and the storage system 104A at the first data center are communicatively coupled through a local network (e.g., as shown by solid line 114A in FIG. 1), and the host system computer 102B and the storage system 104B may be communicatively coupled through a second local network (e.g., as shown by solid line 114B in FIG. 1). In some embodiments, the local communication networks 114A and 114B may include internal (e.g., short distance) communication links (e.g., InfiniBand (IB) link or Fibre Channel (FC) link) to transfer data between storage volumes for storing replicas (also referred to herein as snap sets).

In embodiments, the host system computer 102A at the first data center and the storage system 104B at the second data center may communicate remotely over a long distance network of the networks 112. Likewise, the host system computer 102B at the second data center and the storage system 104A at the first data center may communicate remotely over a long distance network of the networks 112. The long distance communication networks (shown in FIG. 1 as dotted lines 116A and 116B, respectively) may be long-distance communication networks of a storage area network (SAN), e.g., over an Ethernet or Internet (e.g., TCP/IP) link that may employ, for example, the iSCSI protocol.

Also shown in FIG. 1 is a virtualized storage layer 106 including virtual databases 108A-108n. The virtualized storage layer 106 represents a storage array virtualized across two or more physical sites to create a data presence mirrored between the sites and enables simultaneous writes to the two or more sites. The databases 108A-108n may reside in one or more of the storage devices 104A-104B. The virtualized storage layer 106 is communicatively coupled to the host systems 102A-102B through the storage devices 104A-104B via the networks 112.

In embodiments, as shown in FIG. 1, the host system computer 102A and the host system computer 102B each implements a replication manager application 110A and 110B, respectively, to manage the processes described herein. The host system computers 102A and 102B perform IO operations on the storage devices 104A and 104B in an active/active replication session. In some embodiments, the IO operations for each of the host system computers 102A and 102B may be managed the respective replication manager applications 110A and 110B. As changes are made to data stored on storage devices 104A and 104B via the IO operations from the host system computers 102A and 102B, replication manager applications 110A and 110B perform data replication to their local storage systems and to remote storage systems over the networks 112 in an active/active replication mode.

Data replication may be performed based on data replication policies that may define various settings for data recovery operations. For example, one policy may define a plurality of attributes, such as a frequency with which replicas are generated and how long each replica is kept at a storage system. In some embodiments, a policy may define metrics for use in snap set creation and replication process determinations.

In embodiments, replication manager applications 110A and 110B, through the host systems 102A and 102B, are configured to enable designation of one of the storage devices to be a primary storage device. The designation indicates that the selected storage device will orchestrate recovery snapset creation for use during a recovery operation, as will be described further herein. This can be configured as an automated process that is performed by the replication manager applications or may be a manual process.

Figure 2A:
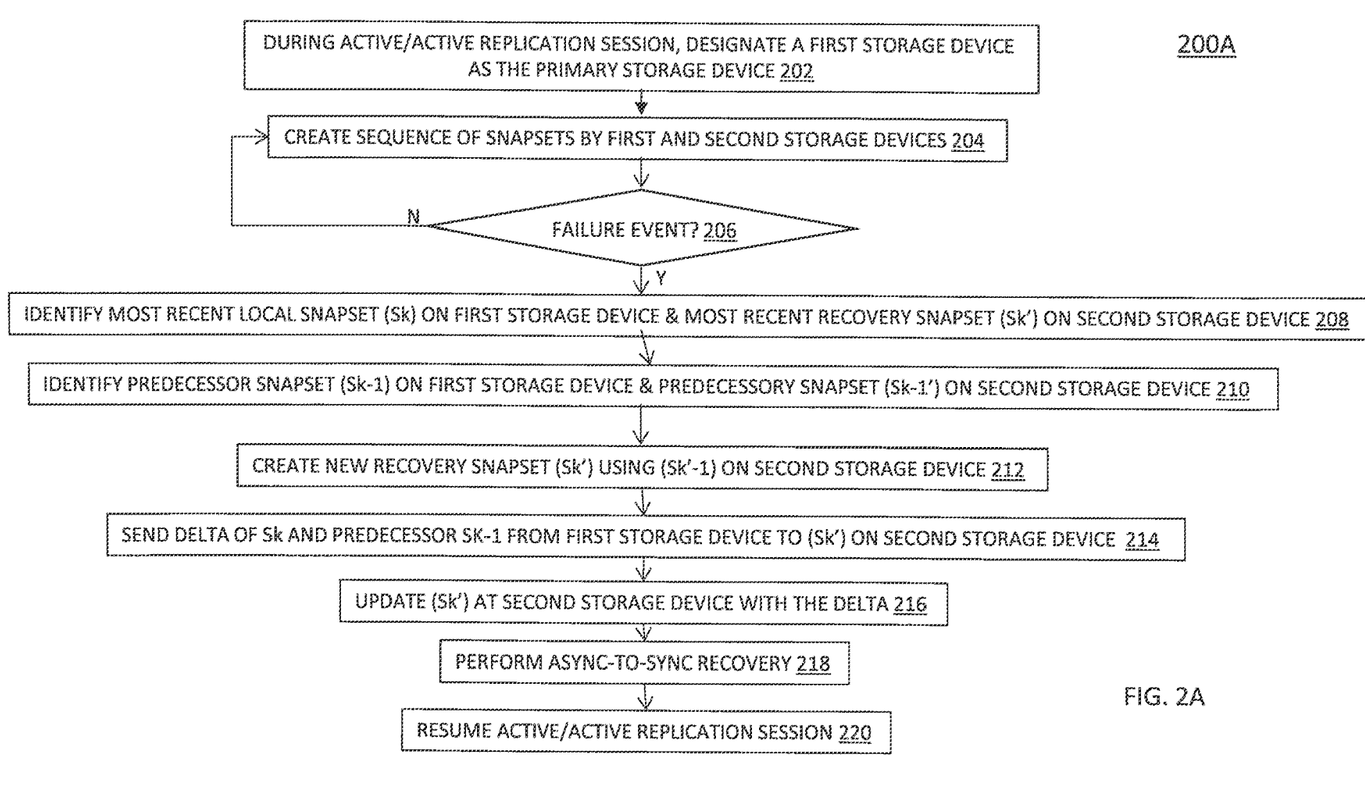
FIGS. 2A-2C are flow diagrams of processes for providing recovery after a service disruption during an active/active replication session in accordance with an illustrative embodiment.
Figure 2B:
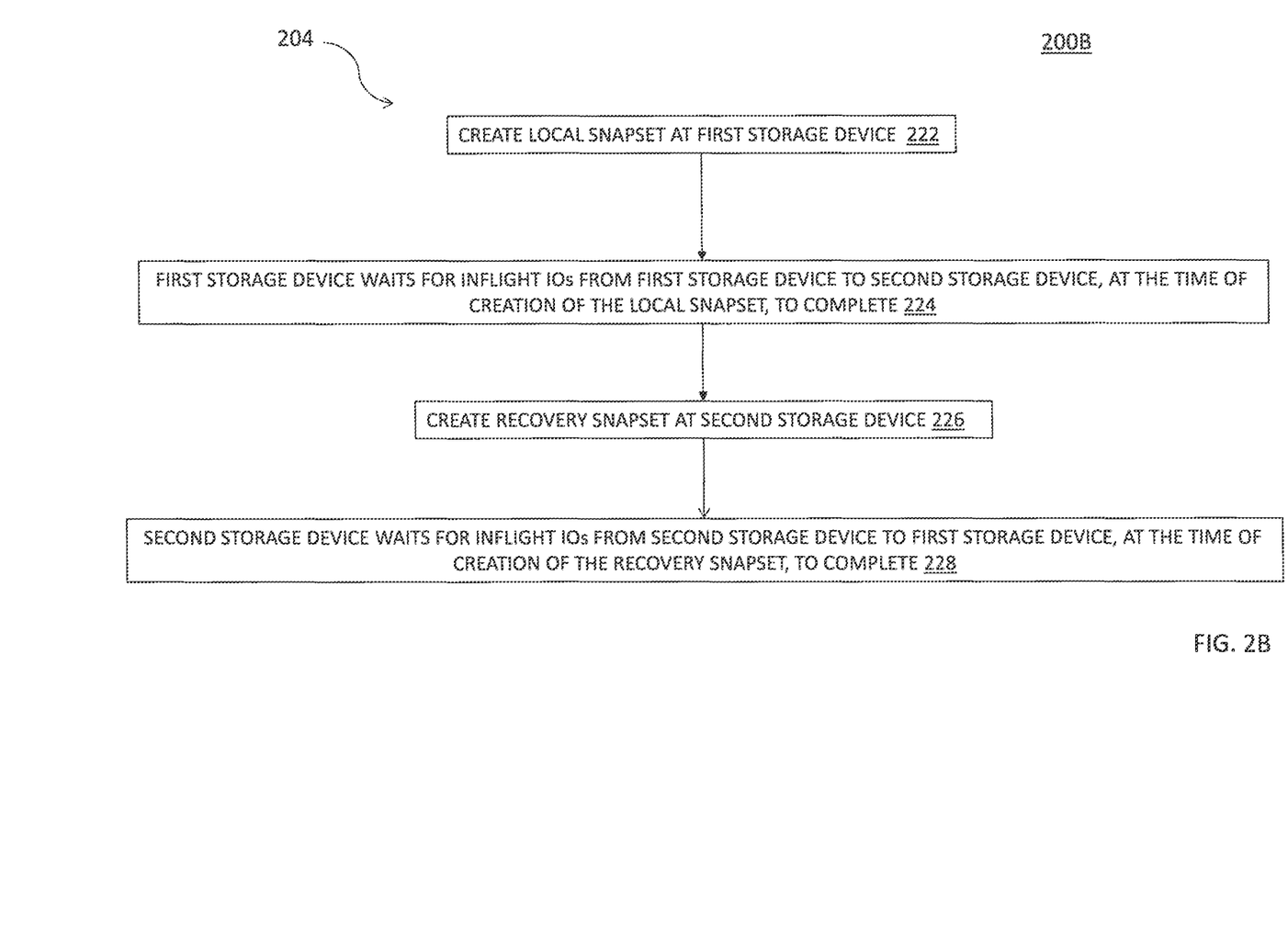
Figure 2C:
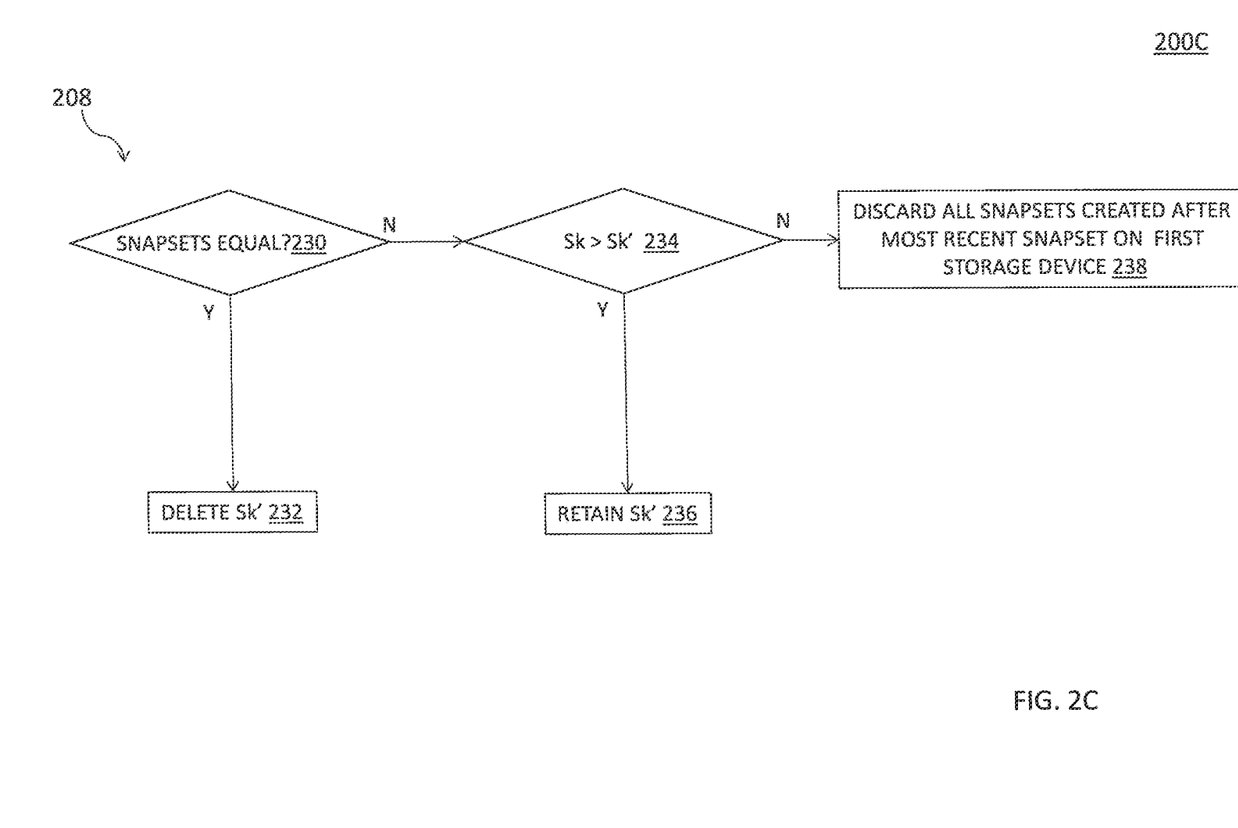

Turning now to FIG. 2A-2C, flow diagrams of processes 200A-200C for performing recovery after a service disruption during an active/active replication session will now be described. The processes described herein provide a mechanism to bring both sides of an active/active replication session back into sync in response to a failure event without requiring additional time-consuming functions otherwise associated with rolling back inflight IOs or synchronized snapsets, thus, minimizing impact on system performance. FIGS. 2A-2C assume that the system (e.g., system 100 of FIG. 1 and/or system 300 of FIG. 3) is performing replication in an active/active replication mode.

In block 202 of FIG. 2A, the process 200A designates one of the storage devices as a primary storage device. The primary storage device designation indicates the designated storage device is tasked with orchestrating a recovery operation, with respect to another storage device, in response to a failure event occurring during the active/active replication session. By way of non-limiting example, the designated storage device (e.g., storage device 104A) is designated to be the primary storage device and the other storage device (e.g., storage device 104B) is referred to as a second storage device.

In block 204, the process 200A periodically creates snapsets at the first and second storage devices to create a sequence of snapsets. This process is described further in FIG. 2B. In block 206, the process 200A determines whether a failure event has occurred. For example, a failure event may be caused by a communication failure or a software/hardware issue. If no failure event has occurred, the process 200A returns to block 204 whereby the process 200A continues to periodically create snapsets at both storage devices.

If, however, at block 206 a failure event has occurred in which the first storage device and the second storage device are out of sync (e.g., they do not contain the same data), the process 200A identifies the most recent local snapset (Sk) created on the first storage device and a most recent recovery snapset (Sk') created on the second storage device in block 208. In this scenario, the first storage device may have data that the second storage device does not have, and the second storage device may have data that the first storage device does not have. The local snapset and recovery snapset, created as part of the sequence of snapsets created in block 204, are described further in FIG. 2B.

In block 210, the process 200A identifies a predecessor local snapset (Sk-1) on the first storage device and a predecessor local snapset (Sk-1') on the second storage device. The identification of the predecessor local snapset will determine various actions to be taken with respect to the snapsets, as described further in FIG. 2C. In block 212, the process 200A creates a new recovery snapset (Sk') using the predecessor local snapset (Sk-1') at the second storage device.

In block 214, the process 200A sends a delta of the most recent local snapset (Sk) and the predecessor local snapset (Sk-1) from the first storage device to the second storage device. In block 216, the process 200A updates the new recovery snapset (Sk') at the second storage device with the delta. In particular, the process 200A performs snap and reassignment to sync up a loser consistency group (CG') on the second storage device to the most recent recovery snapset (Sk') on the second storage device. Note that some data blocks that reside in the bigger snapset and production data may not reside in the smaller snapset. This delta calculation will ensure that those data blocks are transferred. Reassignment includes changing the IO access configuration from a consistency group to the snapset, thus, from the host system point of view, the contents of the consistency group volumes are now changed to the snapset.

Thus, as described above, two snapsets (local and recovery) at the first and second storage devices are created in a way that one can always find a pair of snapsets from both sides in which one is smaller than the other. This means that all the allocated content of the smaller snapset is also present in the larger snapset.

In block 218, the process 200 performs asynchronous to synchronous recovery to transfer a difference between the first storage device and the second storage device. In particular, the async-to-sync recovery process is used to transfer the difference between the consistency group at the first storage device and the most recent local snapset (Sk) at the first storage device to the second consistency group (CG') at the second storage device, where CG'=Sk'+(CG-Sk)=CG. The asynchronous to synchronous recovery provides synchronicity of the snapsets between the first storage device and the second storage device. Thus, the processes described herein enable the identification of a pair of snapsets, on both sides of the storage system, that have a relationship where one snapset from the source is smaller than or equal to the snapset at the target, and use the pair to recover from the source to the target. When the delta between the latest content and the snapset from the source to target is transferred there will be no data that resides in the source that is not also in the target.

In block 220, upon determining there is synchronicity between the first storage device and the second storage device in response to the asynchronous to synchronous recovery performed in block 218, the process 200A resumes the active/active replication session.

Turning now to FIG. 2B, creating the sequence of snapsets (from block 204) includes creating a local snapset at the first storage device in block 222. In block 224, the process 200B, via the first storage device, waits for all inflight IOs from the first storage device to the second storage device, at the time of creation of the local snapset, to be completed at the second storage device. Identifying completion of the inflight IOs may be performed by a notification from the second storage device to the first storage device.

In block 226, the process 200B creates a recovery snapset. The recovery snapset can be created by integrating a local snapset at the second storage device with inflight IOs received at the time of creation of the local snapset. In block 228, the process 200B, via the second storage device, waits for all inflight IOs from the second storage device to the first storage device, at the time of the creation of the recovery snapset, to be completed at the first storage device.

Turning now to FIG. 2C, a process 200C for identifying predecessor snapsets (from block 210 of process 200A) will now be described. In block 230, the process 200C determines whether the most recent local snapset (Sk) on the first storage device is equal to the most recent recovery snapset (Sk') on the second storage device. If so, the recovery snapset (Sk') is deleted in block 232.

If the most recent local snapset (Sk) on the first storage device is not equal to the most recent recovery snapset (Sk') on the second storage device in block 230, the process 200C determines whether the most recent local snapset (Sk) on the first storage device is greater than the most recent recovery snapset in block 234. If the most recent local snapset (Sk) on the first storage device is greater than the most recent recovery snapset in block 234, the process 200C retains the recovery snapset (Sk') in block 236. However, if the most recent local snapset (Sk) on the first storage device is not greater than (block 234), or equal to (block 230), the most recent recovery snapset, this means the most recent local snapset (Sk) on the first storage device is less than the most recovery snapset on the second storage device (block 238). In this instance, the process 200C discards all snapsets created after the most recent local snapset at the first storage device in block 240.

Figure 3:
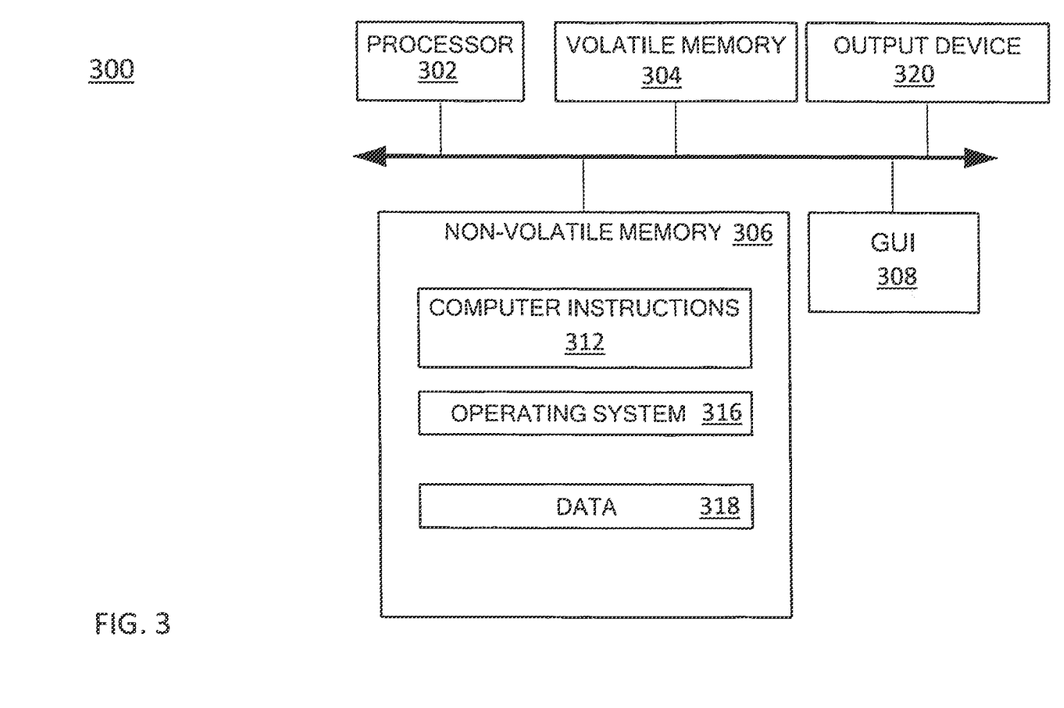
FIG. 3 is a block diagram of a hardware device that may perform at least a portion of the processes shown in FIGS. 2A-2C.

In some embodiments, the host system computers 102A-102B may be implemented as one or more computers, such as a computer 300 as shown in FIG. 3. Computer 300 may include processor 302, volatile memory 304 (e.g., RAM), non-volatile memory 306 (e.g., a hard disk drive, solid state drive such as a flash drive, a hybrid magnetic and solid state drive, etc.), graphical user interface (GUI) 308 (e.g., a mouse, a keyboard, a display, and so forth) and input/output (I/O) device 320. Non-volatile memory 306 stores computer instructions 312, an operating system 316 and data 318 such that, for example, the computer instructions 312 are executed by the processor 302 out of volatile memory 304 to perform at least a portion of the processes 200A-200C shown in FIGS. 2A-2C. Program code may be applied to data entered using an input device of GUI 308 or received from I/O device 320.

Processes 200A-200C shown in FIGS. 2A-2C are not limited to use with the hardware and software of FIG. 3 and may find applicability in any computing or processing environment and with any type of machine or set of machines that is capable of running a computer program. Processes 200A-200C may be implemented in hardware, software, or a combination of the two.

The processes described herein are not limited to the specific embodiments described. For example, processes 200A-200C are not limited to the specific processing order shown in FIGS. 2A-2C. Rather, one or more blocks of processes 200A-200C may be re-ordered, combined or removed, performed in parallel or in serial, as necessary, to achieve the results set forth herein.

Processor 302 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general-purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

In the above-described flow charts of FIG. 2A-2C, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagram does not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Figure 4:
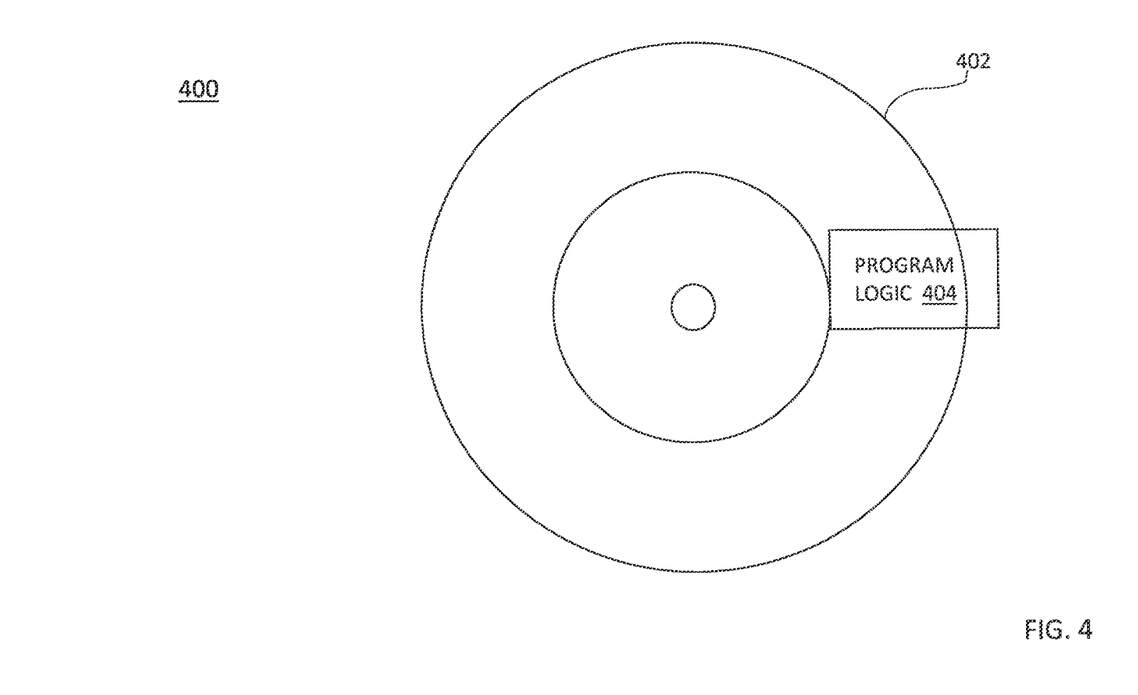
FIG. 4 is a simplified block diagram of an apparatus that may be used to implement at least a portion of the systems of FIGS. 1 and 4 and at least a portion of the process of FIGS. 2A-2C.

For example, when the program code is loaded into and executed by a machine, such as the computer of FIG. 3, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 4 shows Program Logic 404 embodied on a computer-readable medium 402 as shown, and wherein the Logic is encoded in computer-executable code configured for carrying out the reservation service process of this invention and thereby forming a Computer Program Product 400. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method for providing recovery after a service disruption during an active/active replication session, the method comprising:
   during the active/active replication session, creating a sequence of snapsets at a first storage device and a second storage device, the creating comprising periodically performing:
   creating, at the first storage device, a local snapset;
   waiting, by the first storage device, for inflight input/output operations (IOs) from the first storage device to the second storage device, at the time of creation of the local snapset, to complete at the second storage device;
   creating, at the second storage device, a recovery snapset;
   waiting, by the second storage device, for inflight IOs from the second storage device to the first storage device, at the time of creation of the recovery snapset, to complete at the first storage device;
   upon determining an occurrence of a failure event in which the first storage device and the second storage device are out of sync:
   identifying a most recent local snapset (Sk) on the first storage device and a most recent recovery snapset (Sk') on the second storage device;
   identifying a predecessor local snapset (Sk−1) on the first storage device and a predecessor recovery snapset (Sk−1') on the second storage device;
   creating a new recovery snapset (Sk') using the predecessor recovery snapset (Sk−1') at the second storage device;
   sending a delta of the most recent local snapset (Sk) and the predecessor local snapset (Sk−1) from the first storage device to the second storage device;
   updating the new recovery snapset (Sk') at the second storage device with the delta; and
   performing asynchronous to synchronous recovery to transfer a difference from the first storage device to the second storage device, the asynchronous to synchronous recovery providing synchronicity of snapsets between the first storage device and the second storage device.

2. The method of claim 1, further comprising:
   designating the first storage device as a primary storage device, the primary storage device designation indicating the first storage device is tasked with orchestrating a recovery operation, with respect to the second storage device, in response to the failure event occurring during the active/active replication session.

3. The method of claim 1, further comprising:
   upon determining synchronicity between the first storage device and the second storage device in response to the asynchronous to synchronous recovery, resuming the active/active replication session.

4. The method of claim 1, further comprising:
   upon identifying the predecessor local snapset (Sk−1) on the first storage device and the predecessor recovery snapset (Sk−1') on the second storage device, the method comprises:
   upon determining the most recent local snapset (Sk) on the first storage device is equal to the most recent recovery snapset (Sk') on the second storage device, deleting the recovery snapset.

5. The method of claim 1, further comprising:
   upon identifying the predecessor local snapset (Sk−1) on the first storage device and the predecessor recovery snapset (Sk−1') on the second storage device, the method comprises:
   upon determining the most recent local snapset (Sk) is greater than the most recent recovery snapset, retaining the recovery snapset (Sk').

6. The method of claim 1, further comprising:
   upon identifying the predecessor local snapset (Sk−1) on the first storage device and the predecessor recovery snapset (Sk−1') on the second storage device, the method comprises:
   upon determining the most recent local snapset (Sk) is less than the most recent recovery snapset (Sk'), discarding all snapsets created after the most recent local snapset at the first storage device.

7. The method of claim 1, wherein creating the recovery snapset (Sk') includes creating a local snapset at the second storage device and integrating inflight IOs received at the time of creation of the local snapset to the local snapset.

8. A system for providing recovery after a service disruption during an active/active replication session, the system comprising:
   a memory comprising computer-executable instructions; and
   a processor executing the computer-executable instructions, the computer-executable instructions when executed by the processor cause the processor to perform operations comprising:
   during the active/active replication session, creating a sequence of snapsets at a first storage device and a second storage device, the creating comprising periodically performing:
   creating, at the first storage device, a local snapset;
   waiting, by the first storage device, for inflight input/output operations (IOs) from the first storage device to the second storage device, at the time of creation of the local snapset, to complete at the second storage device;
   creating, at the second storage device, a recovery snapset;
   waiting, by the second storage device, for inflight IOs from the second storage device to the first storage device, at the time of creation of the recovery snapset, to complete at the first storage device;
   upon determining an occurrence of a failure event in which the first storage device and the second storage device are out of sync:
   identifying a most recent local snapset (Sk) on the first storage device and a most recent recovery snapset (Sk') on the second storage device;
   identifying a predecessor local snapset (Sk−1) on the first storage device and a predecessor recovery snapset (Sk−1') on the second storage device;
   creating a new recovery snapset (Sk') using the predecessor recovery snapset (Sk−1') at the second storage device;
   sending a delta of the most recent local snapset (Sk) and the predecessor local snapset (Sk−1) from the first storage device to the second storage device;
   updating the new recovery snapset (Sk') at the second storage device with the delta; and
   performing asynchronous to synchronous recovery to transfer a difference from the first storage device to the second storage device, the asynchronous to synchronous recovery providing synchronicity of snapsets between the first storage device and the second storage device.

9. The system of claim 8, wherein the operations further comprise:
   designating the first storage device as a primary storage device, the primary storage device designation indicating the first storage device is tasked with orchestrating a recovery operation, with respect to the second storage device, in response to the failure event occurring during the active/active replication session.

10. The system of claim 8, wherein the operations further comprise:
    upon determining synchronicity between the first storage device and the second storage device in response to the asynchronous to synchronous recovery, resuming the active/active replication session.

11. The system of claim 8, wherein upon identifying the predecessor local snapset (Sk−1) on the first storage device and the predecessor recovery snapset (Sk−1') on the second storage device, operations further comprise:
    upon determining the most recent local snapset (Sk) on the first storage device is equal to the most recent recovery snapset (Sk') on the second storage device, deleting the recovery snapset.

12. The system of claim 8, wherein upon identifying the predecessor local snapset (Sk−1) on the first storage device and the predecessor recovery snapset (Sk−1') on the second storage device, the operations further comprise:
    upon determining the most recent local snapset (Sk) is greater than the most recent recovery snapset (Sk'), retaining the most recent recovery snapset (Sk').

13. The system of claim 8, wherein upon identifying the predecessor local snapset (Sk−1) on the first storage device and the predecessor recovery snapset (Sk−1') on the second storage device, the operations further comprise:
    upon determining the most recent local snapset (Sk) is less than the most recent recovery snapset (Sk'), discarding all snapsets created after the most recent local snapset (Sk) at the first storage device.

14. The system of claim 8, wherein creating the recovery snapset includes creating a local snapset at the second storage device and integrating inflight IOs received at the time of creation of the local snapset of the second storage device to the local snapset of the second storage device.

15. A computer program product for providing recovery after a service disruption during an active/active replication session, the computer program product embodied on a non-transitory computer readable medium and including instructions that, when executed by a computer causes the computer to perform operations comprising:
    during the active/active replication session, creating a sequence of snapsets at a first storage device and a second storage device, the creating comprising periodically performing:
    creating, at the first storage device, a local snapset;
    waiting, by the first storage device, for inflight input/output operations (IOs) from the first storage device to the second storage device, at the time of creation of the local snapset, to complete at the second storage device;
    creating, at the second storage device, a recovery snapset;
    waiting, by the second storage device, for inflight IOs from the second storage device to the first storage device, at the time of creation of the recovery snapset, to complete at the first storage device;
    upon determining an occurrence of a failure event in which the first storage device and the second storage device are out of sync:
    identifying a most recent local snapset (Sk) on the first storage device and a most recent recovery snapset (Sk') on the second storage device;
    identifying a predecessor local snapset (Sk−1) on the first storage device and a predecessor recovery snapset (Sk−1') on the second storage device;
    creating a new recovery snapset (Sk') using the predecessor recovery snapset (Sk−1') at the second storage device;
    sending a delta of the most recent local snapset (Sk) and the predecessor local snapset (Sk−1) from the first storage device to the second storage device;
    updating the new recovery snap set (Sk') at the second storage device with the delta; and
    performing asynchronous to synchronous recovery to transfer a difference from the first storage device to the second storage device, the asynchronous to synchronous recovery providing synchronicity of snapsets between the first storage device and the second storage device.

16. The computer program product of claim 15, wherein the operations further comprise:
 designating the first storage device as a primary storage device, the primary storage device designation indicating the first storage device is tasked with orchestrating a recovery operation, with respect to the second storage device, in response to the failure event occurring during the active/active replication session.

17. The computer program product of claim 15, wherein the operations further comprise:
 upon determining synchronicity between the first storage device and the second storage device in response to the asynchronous to synchronous recovery, resuming the active/active replication session.

18. The computer program product of claim 15, wherein upon identifying the predecessor local snapset (Sk−1) on the first storage device and the predecessor recovery snapset (Sk−1') on the second storage device, the operations further comprise:
 upon determining the most recent local snapset (Sk) on the first storage device is equal to the most recent recovery snapset (Sk') on the second storage device, deleting the recovery snapset.

19. The computer program product of claim 15, wherein upon identifying the predecessor local snapset (Sk−1) on the first storage device and the predecessor recovery snapset (Sk−1') on the second storage device, the operations further comprise:
 upon determining the most recent local snapset (Sk) is greater than the most recent recovery snapset, retaining the most recent recovery snapset (Sk').

20. The computer program product of claim 15, wherein upon identifying the predecessor local snapset (Sk−1) on the first storage device and the predecessor recovery snapset (Sk−1') on the second storage device, the operations further comprise:
 upon determining the most recent local snapset (Sk) is less than the most recent recovery snapset (Sk'), discarding all snapsets created after the most recent local snapset (Sk) at the first storage device.

\* \* \* \* \*